United States Patent
Domke et al.

(10) Patent No.: US 7,593,580 B2
(45) Date of Patent: Sep. 22, 2009

(54) VIDEO ENCODING USING PARALLEL PROCESSORS

(75) Inventors: Damon Domke, McKinney, TX (US); Youngjun Yoo, Plano, TX (US); Deependra Talla, Dallas, TX (US); Ching-Yu Hung, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 820 days.

(21) Appl. No.: 10/890,509

(22) Filed: Jul. 13, 2004

(65) Prior Publication Data

US 2005/0053131 A1 Mar. 10, 2005

Related U.S. Application Data

(60) Provisional application No. 60/487,016, filed on Jul. 14, 2003.

(51) Int. Cl.
*G06K 9/36* (2006.01)
(52) U.S. Cl. .................. 382/232; 382/236
(58) Field of Classification Search ......... 382/232–239; 375/240.06
See application file for complete search history.

(56) References Cited

U.S. PATENT DOCUMENTS

| | | | | | |
|---|---|---|---|---|---|
| 5,267,334 | A | * | 11/1993 | Normille et al. | 382/236 |
| 5,946,417 | A | * | 8/1999 | Bonneau et al. | 382/236 |
| 5,969,764 | A | * | 10/1999 | Sun et al. | 375/240.06 |
| 6,081,622 | A | * | 6/2000 | Carr et al. | 382/236 |

* cited by examiner

*Primary Examiner*—Duy M Dang
(74) *Attorney, Agent, or Firm*—Robert D. Marshall, Jr.; Wade J. Brady, III; Frederick J. Telecky, Jr.

(57) ABSTRACT

A digital video acquisition system including a plurality of image processors (30A; 30B) is disclosed. A CCD imager (22) presents video image data on a bus (video_in) in the form of digital video data, arranged in a sequence of frames. A master image processor (30A) captures and encodes a first group of frames, and instructs a slave image processor (30B) to capture and encode a second group of frames presented by the CCD imager (22) before the encoding of the first group of frames is completed by the master image processor. The master image processor (30A) completes its encoding, and is then available to capture and encode another group of frames in the sequence. Video frames that are encoded by the slave image processor (30B) are transferred to the master image processor (30A), which sequences and stores the transferred encoded frames and also those frames that it encodes in a memory (36A; 38). The parameters of the encoding operation can be dynamically adjusted, for example in response to the nature of the video sequences being captured.

19 Claims, 3 Drawing Sheets

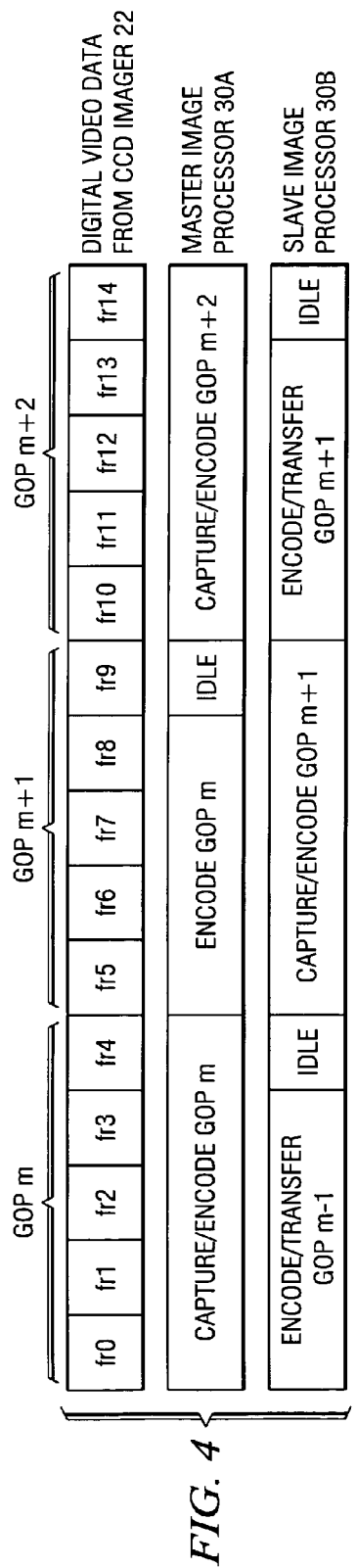

VIDEO ENCODING USING PARALLEL PROCESSORS

CROSS-REFERENCE TO RELATED APPLICATIONS

This application claims priority, under 35 U.S.C. §119(e), of Provisional Application No. 60/487,016, filed Jul. 14, 2003.

STATEMENT REGARDING FEDERALLY SPONSORED RESEARCH OR DEVELOPMENT

Not applicable.

BACKGROUND OF THE INVENTION

This invention is in the field of digital video processing, and is more specifically directed to systems for acquiring and digitally encoding video images.

Over recent years, much of the video display, storage, and communication has made a transition from analog to digital formats. For example, digital video disks (DVDs) are now the preferred manner of storing and distributing video content. Many broadcast technologies, such as satellite television broadcasts and cable television, now communicate digital video data, and many local television stations now offer both analog and digital broadcast channels (in anticipation of the conversion to digital-only broadcasting). And, of course, the distribution of streaming and downloadable video content over the Internet is quite popular.

Modern digital video communication and storage relies heavily on compression to keep transmission and storage costs reasonable. Typical compression techniques include standardized approaches such as those promulgated by the Motion Picture Experts Group ("MPEG"), which achieve compression ratios (raw to compressed) of on the order of 10 to 100. For example, the MPEG-2 compression standard is the current compression approach for satellite TV broadcast transmissions, with a typical compression ratio of about 40.

Of course, computational work is required in order to compress a sequence of digital video images. This results in a tradeoff between computational complexity and the memory and bandwidth savings obtained by the compression. At one extreme, if raw digital image data (e.g., twenty-four bits per pixel) were stored and communicated, no compression computations would be required, but the memory and transmission data rate requirements would be massive. At the other extreme, the memory requirements and transmission bandwidth can be greatly minimized by aggressive compression techniques, but at a cost of significant computational complexity and, perhaps, latency resulting from the compression process. Despite the limitations raised by this tradeoff, the demand for high-resolution digital video storage and transmission at minimum cost continues unabated.

By way of further background, modern compression techniques such as MPEG-2 involve significantly more computational complexity for encoding than for decoding. MPEG-2 encoding typically requires three to ten times the computations as decoding. When encoding is to be performed in consumer equipment, such as digital cameras, digital camcorders, and video conferencing equipment, the encoding of video image data is often the primary system constraint.

As known in the art, the MPEG-2 standard contemplates many resolution and frame rate options. However, whether under the MPEG-2 standard or another standard, it is desirable to encode video data at high frame rates, such as up to 30 frames per second (fps). This level of compression is typically accomplished by grouping frames, or images ("pictures") in the video sequence. The first image in the "group of pictures" ("GOP") is referred to as an "I" ("intra") frame, meaning its compression and encoding is performed using only its own information (i.e., independent from other frames). The other images in the GOP following the I frame are referred to as "P" ("predicted") frames, and are encoded using the context of the "I" frame in the GOP as well as previously encoded "P" frames. In short, the encoding of "P" frames involves the comparison of pixel information in the current image to the previous images in the group, with only the changes from one image to the next being encoded. Encoders (or "video codecs") under the MPEG-2 and other standards can also include so-called "B" frames, which are bidirectionally predicted (i.e., predicted from both a preceding frame and also a following frame). This compression approach saves significant memory and communication bandwidth, but involves significant computational resources. Depending on how much change is present from frame to frame, a typical GOP includes one "I" frame followed by four or five "P" frames. But regardless of the computational resources, the target frame rate under the MPEG-2 standard is 30 fps at the output of the encoder must be met, although some systems may operate adequately at lower frame rates (e.g., 24 fps).

Referring now to FIG. 1, a conventional video encoding system will now be described, to provide further background for this invention. The system of FIG. 1 corresponds to a digital video camera; it will be understood, by those skilled in the art having reference to this specification, that the system of FIG. 1 can also correspond to a conventional digital video recorder, or other device or system for storing compressed digital video. In the example of FIG. 1, incoming video images are received via a lens system (not shown) and converted from light to electrical signals by CCD imager 2. CCD imager 2 produces digital electrical signals corresponding to the color and intensity of the received light and forwards these signals over bus video_in to image processor 10. It is contemplated that the digital video communicated over bus video_in will correspond to a sequence of video images, or "frames", and as such constitute full motion video acquisition. Microphone M detects sound simultaneously with the received images; electrical signals corresponding to the sound detected by microphone M are converted into digital form by conventional audio coder/decoder ("codec") 4, and are forwarded to image processor 10 over line audio_in.

Image processor 10, in this conventional system, is a conventional image processor device such as the DM310 image processor available from Texas Instruments Incorporated. Image processor 10 is a digital processing device, and is responsible for carrying out such functions as encoding of the incoming digital video data into a compressed form, managing memory resources in the system, arranging the images for real-time display on LCD display 15, and handling end-user interactions such as start/stop of record/playback, adjusting resolution or frame rate, and the like. In the conventional system of FIG. 1, the memory resources include flash memory 14, which serves as a boot ROM for image processor 10; external memory interface (EMIF) decoder 12 is provided to interface image processor 10 with flash memory 14 in this conventional system. Synchronous dynamic random access memory (SDRAM) 16 is connected to image processor 10 over a conventional memory bus, and is sized sufficiently to record the incoming video images and encoded audio. Memory card 18 provides removable storage for the recorded video sequences, as another memory resource in the system.

In operation, image processor 10 is reset according to code stored in flash memory 14. Incoming digital video imaged by CCD imager 2 is received by image processor 10. Image processor 10 encodes and compresses these digital video data for storage in SDRAM 16 (or in memory card 18, if selected by the user). If real-time previewing during video acquisition is enabled, image processor 10 also forwards displayable image data to LCD display 15. After video acquisition, image processor 10 can also control the communication of stored video from SDRAM 16 or memory card 18 to LCD display 15 for local playback. In addition, image processor 10 can also download the stored video data to a computer or other device by way of a conventional USB or IEEE 1394 interface (not shown).

As mentioned above, the encoding and compression of the incoming video image data by image processor 10 must meet certain constraints. Typically, image processor 10 must have sufficient computational capacity to encode and compress image data corresponding to a specified frame rate. As mentioned above, the MPEG-2 standard requires a frame rate of 30 frames per second, for example.

But the computational resources of image processor 10 are of course finite. In order to meet the specified frame rate with these finite resources, other parameters in the video encoding are necessarily limited. These limitations are most often evident in the resolution of the encoded image sequence, resulting in a limited image size in pixels or a grainy image appearance. The encoding may also skip frames of the incoming video sequence in order to reach the specified frame rate, causing rapidly moving features in the video sequence to appear "choppy" when displayed. Therefore, it continues to be desirable to increase the computational resources of image processors, such as image processor 10 in the system of FIG. 1, in order to achieve a desired frame rate with the highest resolution image as possible with realistic frame-to-frame transitions. But the cost of providing these desired capabilities can surpass the design cost constraints.

As mentioned above, for a given frame rate, additional demands for high resolution video transmission and storage continue to accrue. In particular, high-definition television ("HDTV") is becoming increasingly popular, especially as additional HD programs and content sources appear in the marketplace. Video encoding and compression of HD video images, particularly at the camera and transmission functions, greatly increases the computational requirements for compression beyond that of conventional video acquisition and recording. The processing requirements for HD video acquisition are now sufficiently high that HD systems remain somewhat cost prohibitive.

BRIEF SUMMARY OF THE INVENTION

It is therefore an object of this invention to provide a video encoding system and method of encoding in which additional computational resources are provided for the encoding and compression of incoming digital video.

It is a further object of this invention to provide such a system and method in which the additional resources are easily scalable to achieve the desired resolution and frame rate, including such advanced high-resolution video as high-definition television ("HDTV").

It is a further object of this invention to provide such a system and method in which the processing load and resources can be dynamically controlled, for example in response to the demands of the incoming video signal.

It is a further object of this invention to provide such a system and method in which the computational requirements for audio encoding and system management can be taken into account.

Other objects and advantages of this invention will be apparent to those of ordinary skill in the art having reference to the following specification together with its drawings.

The present invention may be implemented into a digital video system, such as a digital video camera or digital video recorder, by providing a master processor for encoding incoming digital video, in combination with one or more slave processors for also encoding incoming digital video. The multiple processors are controlled to sequentially encode incoming groups of pictures. In this way, one of the processors can complete the encoding a group of pictures while another one of the processors is capturing and beginning to encode the next group of pictures. The master processor will receive the encoded results from the slave processor or processors, and store the encoded groups of pictures in sequence, along with encoded audio input signals.

BRIEF DESCRIPTION OF THE SEVERAL VIEWS OF THE DRAWING

FIG. 4 is a timing diagram illustrating an example of the operation of the video encoding system of FIG. 2, according to the preferred embodiment of the invention.

FIG. 5 is a timing diagram illustrating an example of the switchover of encoding between image processors in the system of FIG. 2, according to the preferred embodiment of the invention.

DETAILED DESCRIPTION OF THE INVENTION

The present invention will be described in connection with its preferred embodiment, namely as implemented into a digital video acquisition system such as a digital video camera or a digital video recorder, because it is contemplated that the invention is especially beneficial in such applications. However, it is also contemplated that this invention can also provide significant benefits to other applications. Accordingly, it is to be understood that the following description is provided by way of example only, and is not intended to limit the true scope of this invention as claimed.

Figure 1:
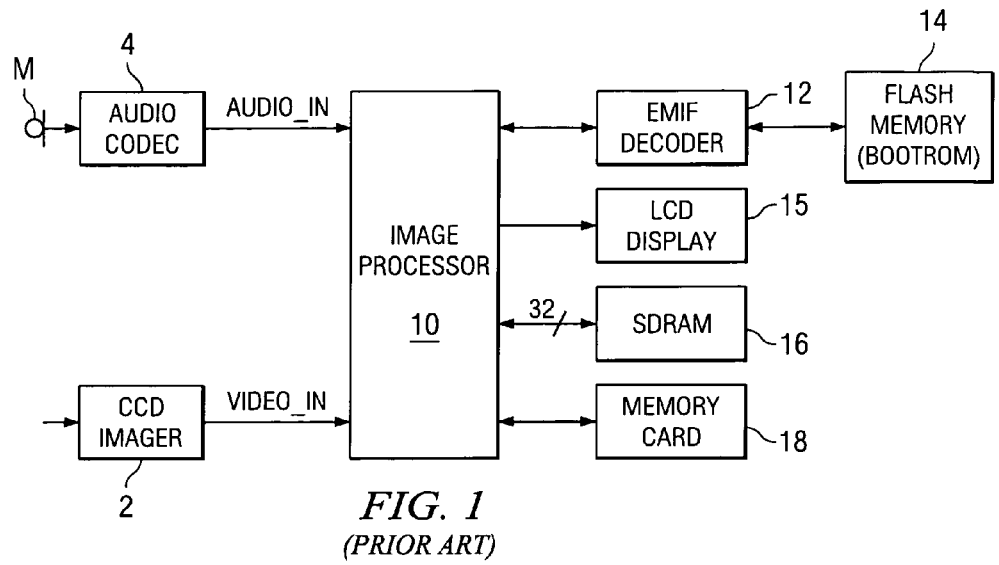
FIG. 1 is an electrical diagram, in block form, of a conventional video encoding system.
Figure 2:
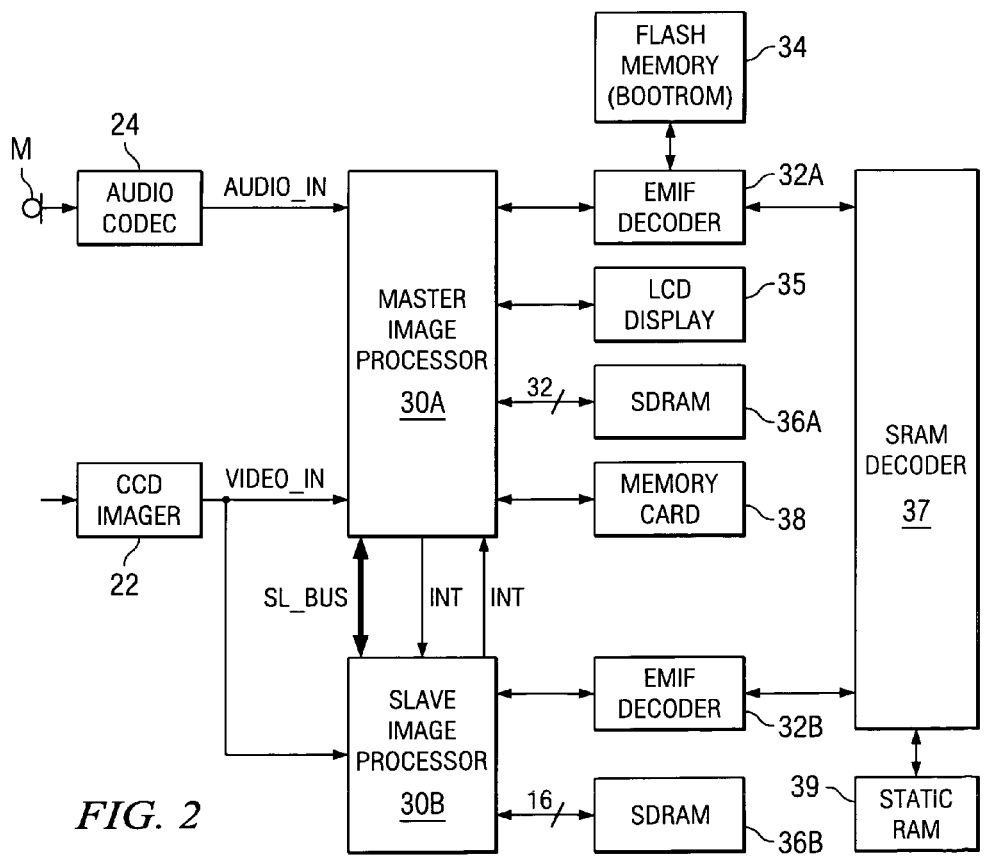
FIG. 2 is an electrical diagram, in block form, of a video encoding system constructed according to the preferred embodiment of the invention.

Referring first to FIG. 2, the construction of a video acquisition system, such as a digital video camera, constructed according to a preferred embodiment of the invention, will now be described in detail. In the system of FIG. 2, video images are obtained through a conventional lens system (not shown), and converted to electrical signals by CCD imager 22. Of course, those skilled in the art having reference to this specification will recognize that other types of imagers and sources of digital video data (e.g., digitized output converted from analog video signals) may alternatively provide the digital video data to the system. Corresponding audio information is acquired via one or more microphones M, and the electrical analog output from microphone M is converted to encoded digital form by audio codec 24.

According to this preferred embodiment of the invention, master image processor 30A and slave image processor 30B each receive digital signals corresponding to video image frames from CCD imager 22 over bus video_in. As will be described in further detail below, additional slave image processors 30B may also be provided in the system, depending upon the resolution and frame rate of the recorded video sequences. For example, up to twelve image processors 30, eleven of which are slaved to master image processor 30A, are contemplated for the acquisition and recording of high definition television (HDTV) quality video. However, the single slave image processor 30B in the dual-processor architecture of FIG. 2 is contemplated to be adequate for many applications. In this embodiment of the invention, master image processor 30A also receives digital audio signals from audio codec 24.

Master image processor 30A is a programmable logic device having sufficient computational resources and capacity for performing digital processing of digital video data received from CCD imager 22 on bus video_in and corresponding digital audio received from codec 24 on bus audio_in, which is preferably a conventional data bus, such as according to the well-known multi-channel buffered serial port (McBSP) standard. According to this preferred embodiment of the invention, however, the computational capacity and throughput of master image processor 30A need not be so large as to require the encoding of all frames in real time (i.e, completing encoding prior to the receipt of the next frame), and as such these resources can be kept quite modest. It is contemplated that this processing will include the conventional operations of encoding and compressing of the digital video data, and the corresponding encoding of the incoming digital audio data in association with the encoded video data, in the conventional manner. An example of a preferred integrated circuit having these capabilities and suitable for use in the system of FIG. 2 according to this embodiment of the invention is the DM310 image processor available from Texas Instruments Incorporated.

Master image processor 30A preferably includes one or more appropriate external memory interface (EMIF) ports by way of which it can communicate with external memory. In this example, one such port is coupled via EMIF decoder 32A to flash memory 34, which is non-volatile memory that can serve as a "boot ROM" for master image processor 30A. Other memory or input/output ports of master image processor 30A are also provided, as will now be described.

Master image processor 30A is connected by a parallel data bus to SDRAM 36A, which stores encoded and compressed digital video image data. SDRAM 36A also serves as a temporary buffer memory for master image processor 30A, and in this role stores incoming digital video data from CCD imager 22 for later encoding. Memory card 38 is also connected to master image processor 30A, and provides a removable storage medium as a selectable destination of the encoded video data. Master image processor 30A is also connected to LCD display 35. LCD display 35 can thus display images during video acquisition in a real-time preview mode, or previously recorded video image data retrieved from SDRAM 36A or memory card 38 in a playback mode.

According to this embodiment of the invention, master image processor 30A also includes the appropriate interfaces and ports for communicating with slave image processor 30B. According to this preferred embodiment of the invention, bus SL_BUS couples master image processor 30A to slave image processor 30B. Bus SL_BUS is contemplated to be a conventional high-speed data bus such as according to the USB 2.0 or IEEE 1394 standards; alternatively, bus SL_BUS may be a parallel data bus, a non-standard or proprietary data bus, or any other type of data bus suitable for the high-speed communication of digital data between processors 30A, 30B. According to this embodiment of the invention, encoded digital video data will be communicated from slave image processor 30B to master image processor 30A over bus SL_BUS. In addition, low-priority control signals and information that are latency-tolerant may be communicated over bus SL_BUS. Interrupt control lines INT also connect slave image processor 30B, 30A, to provide high-priority low-latency control capability.

Slave image processor 30B can be constructed effectively identically as master image processor 30A, an example of which is the DM310 image processor available from Texas Instruments Incorporated. In the system of FIG. 2, an input port of slave image processor 30B is connected to bus video_in. An input/output or external memory interface (EMIF) port of slave image processor 30B is bidirectionally coupled to SDRAM 36B, for example over a parallel sixteen-bit bus as shown in FIG. 2. SDRAM 36B serves as temporary storage for storing captured digital video image data from CCD imager 22 for encoding by slave image processor 30B, and also for temporarily storing the results of the encoding by slave image processor 30B prior to transfer of this encoded data to master image processor 30A. An EMIF port of slave image processor 30B is also connected to EMIF decoder 32B. EMIF decoder 32B may be coupled directly to flash memory 34. Optionally, as shown in FIG. 2, EMIF decoders 32A, 32B may be connected to shared static RAM 39, for example by way of SRAM decoder 37; shared SRAM 39 provides another resource for communication of encoded digital video data or other information between master image processor 30A and slave image processor 30B.

Figure 3:
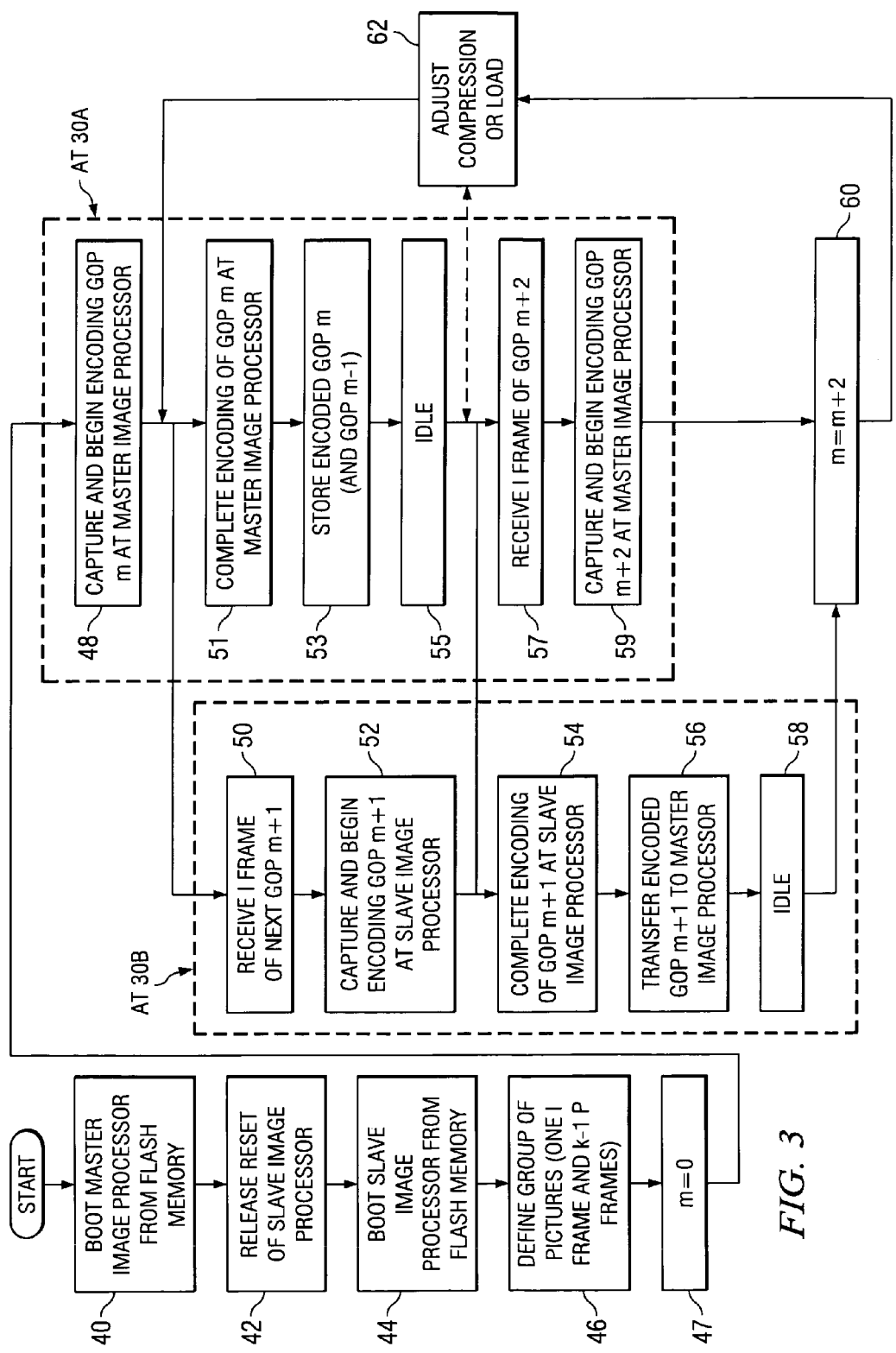
FIG. 3 is a flow chart illustrating the operation of the video encoding system of FIG. 2, according to the preferred embodiment of the invention.

The operation of the system of FIG. 2 will now be described with reference to FIGS. 3 and 4. As shown in FIG. 3, master image processor 30A is initialized in process 40 from flash memory 34, which serves as a boot ROM for master image processor 30A; during this time, slave image processor 30B is held in its "reset" position by master image processor 30A. Upon completion of boot process 40 for master image processor 30A, the reset state of slave image processor 30B is released by master image processor 30A in process 42. Slave image processor 30B then boots from flash memory 34, in process 44.

In this example, process 46 is executed to define the number of video frames in a "group of pictures" (or "GOP"), preferably by master image processor 30A under program or user control. According to this embodiment of the invention, for simplicity of implementation, the ratio of "P" frames to each "I" frame that defines a GOP may be kept constant, as defined in process 46 prior to encoding. Alternatively, as will be described below, the GOP structure may be dynamically adjusted during receipt of the video image stream, for example by referring to header information within each video frame that specifies the frame type. For purposes of this description, GOP index m is initialized to zero in process 47.

The first frame of the first GOP m=0 is then received by master image processor 30A from CCD imager 22 to begin process 48. Process 48 continues with the capture and encoding of this first frame and the remainder of the "P" frames in this first GOP m=0. However, according to this embodiment of the invention, the resolution of the received frames is sufficiently high that the entire GOP m may not be fully encoded in real time before the next GOP m+1 is presented by CCD imager 22. In other words, the "I" frame of the next GOP m+1 can be received (process 50) before the encoding of the first GOP m is completed. According to this preferred embodiment of the invention, in process 52, slave image processor 30B captures and begins encoding the frames of next GOP m+1 beginning with the first frame (the "I" frame) of GOP m+1 that is presented by CCD imager 22. While slave image processor 30B is carrying out capture and encode process 52, master image processor 30A completes the encoding of the first GOP m in process 51, stores the encoded digital video data for GOP m in SDRAM 36A or memory card 38 in process 53, and then idles in process 55 for any remaining time within the duration of incoming GOP m+1.

Upon CCD imager 22 presenting the first, "I", frame of the next GOP m+2 in process 57, master image processor 30A captures and begins encoding the frames in GOP m+2 in process 59. During this time, slave image processor 30B completes the encoding of the frames in the previous GOP m+1 in process 54, and transfers the encoded digital video image data for this GOP m+1 to master image processor 30B over bus SL_BUS, in process 56. Slave image processor 30B then enters an idle state in process 58, during the remainder of the duration of the incoming GOP m+2.

This alternating encoding operation between master image processor 30A and slave image processor 30B is then repeated for additional incoming video frames from CCD imager 22. For purposes of the flow chart illustrated in FIG. 3, index m is incremented by two in process 60, and control returns to processes 50, 51 for the next incoming GOP. In the repeated instances of storing process 53, master image processor 30A sequences the encoded data from slave image processor 30A with the data encoded by itself, and stores the pair of encoded frames in SDRAM 36A or memory card 38 in process 53. In this way, the encoded digital video data is recorded in a manner that is transparent to whatever system plays this video back, with all frames similarly encoded and in sequence, and associated with audio data from codec 24.

FIG. 4 illustrates, by way of a timing diagram, an example of the alternating encoding operation carried out by the system of FIG. 2 according to the preferred embodiment of the invention. In this example, each GOP includes one "I" frame and four "P" frames. Accordingly, GOP m consists of "I" frame fr0 and "P" frames fr1 through fr4, GOP m+1 consists of "I" frame fr5 and "P" frames fr6 through fr9, and GOP m+2 consists of "I" frame fr10 and "P" frames fr11 through fr14.

During the time at which GOP m is being received at CCD imager 22 and forwarded as digital video signals over bus video_in to master image processor 30A, slave image processor 30B is encoding and transferring encoded digital video for a previous GOP m−1, following which slave image processor 30B enters an idle state. During this time master image processor 30A captures and encodes the incoming GOP m from CCD imager 22, as shown in FIG. 4.

However, in this example, the resolution of the incoming frames fr0 through fr4 in GOP m is sufficiently high that master image processor 30A is not able to encode GOP m in real-time. In other words, the encoding of GOP m is not complete at master image processor 30A by the time that the digital image data for the next GOP m+1, beginning with frame fr5, is presented by CCD imager 22. According to this preferred embodiment of the invention, slave image processor 30B (previously in its idle state, as shown during frame fr4 of GOP m) captures and begins encoding the digital video data from CCD imager 22 corresponding to this new GOP m+1. Meanwhile, master image processor 30A completes the encoding of GOP m, and stores the encoded digital video data for this GOP m (and also the encoded data for the previous GOP m−1 transferred from slave image processor 30B over bus SL_BUS) in SDRAM 36 or memory card 38. Also during this time, master image processor 30A is capable of controlling the preview of the received images over LCD display 35, and the encoding and storage of digital audio data received from codec 24. Upon completing the encoding of previous GOP m (and the storing, previewing, and audio coding processes), master image processor 30A enters the idle state. This all occurs prior to the time that the data for the last frame fr9 of GOP m+1 is received from CCD imager 22.

The digital video data for GOP m+2 is then presented by CCD imager 22, and is captured and encoded by master image processor 30A (previously idle). During the capture and encoding of GOP m+2, slave image processor 30B continues and completes the encoding of the digital video data for GOP m+1, and transfers the encoded data to master image processor 30A over bus SL_BUS. Slave image processor 30B then enters the idle state, awaiting the next GOP m+3. The alternating encoding process continues for additional image frames in this manner.

According to the preferred embodiment of the invention, as evident from this description, the real-time control of master and slave image processors 30 is based on GOP boundaries. FIG. 5 illustrates an example of the communication of the control signals between master image processor 30A and slave image processor 30B according to the preferred embodiment of the invention.

As shown in FIG. 5, each frame is initiated with a vertical sync indicator VSYNC, which is a specific digital word, considering that CCD imager 22 presents the image frames in the form of digital video data. As in the example of FIG. 4, frames fr3, fr4 belong to GOP m, which is being captured and encoded by master image processor 30A. In response to indicator VSYNC at the beginning of frame fr4, which is the last frame of GOP m, master image processor 30A sends a control message to slave image processor 30B; preferably, this control message is a high priority, low latency, message that is communicated by an interrupt INT (FIG. 2). In this interrupt INT, master image processor 30A communicates to slave image processor 30B that it is to capture and encode the next k digital video frames communicated by CCD imager (after the current frame fr4). In this example, referring to FIG. 4, the number of frames k is five (one "I" frame fr5 followed by four "P" frames fr6 through fr9). Upon receipt and comprehension of the interrupt INT, slave image processor 30B issues an acknowledge ACK, also preferably by way of an interrupt.

This handshaking indicates that the operation of master and slave image processors 30A, 30B are synchronized, with slave image processor 30B ready to begin capture and encoding with the next frame fr5. Internally, the appropriate control functions within image processors 30 can now be carried out. For example, slave image processor 30B can set an internal counter to the number of frames k=5 that are to be encoded beginning with the next VSYNC; similarly, master image processor 30A can set a "do not encode" counter also to the number of frames k that it is to ignore before beginning encoding again (beginning with frame fr10 in GOP m+2, as shown in FIG. 4). Upon the VSYNC for frame fr5, slave image processor 30B then begins its capture and encode process, while master image processor 30A completes the encoding of GOP m. Similar handshaking can be effected upon the transition of encoding from slave image processor 30B to master image processor 30A prior to GOP m+2. Alternatively a default condition can be assumed (i.e., slave image processor 30B can simply stop encoding upon its internal decoder counter reaching zero, and master image processor 30A can begin encoding upon its internal "do not encode" counter reaching zero).

Of course, other techniques of control and communication among image processors 30 other than the handshaking control described above. It is contemplated that those skilled in the art having reference to this specification will be readily able to implement such alternative control approaches.

Referring back to FIG. 3, it is contemplated that the system according to the preferred embodiment of the invention can effect various dynamic adjustments during operation, by way of process 62. These dynamic adjustments are preferably made between GOPs, so that the encoding process can remain coherent, especially using control arrangements such as that described above relative to FIG. 5. One important dynamic adjustment that can be made in process 62 is the adjustment of the distribution of the encoding load between master and slave image processors 30. For example, if the acquired video sequence is rather slow moving, such that there is little change from one frame to the next, it may be possible for master image processor 30A to perform all of the video encoding, in which case slave image processor 30B may be placed in an idle, or power-down state to save power. Alternatively, if the demand for audio encoding, preview functions, or other operations that must be performed by master image processor 30A increase, the video encoding load may be shifted toward slave image processor 30B in adjustment process 62.

Further in the alternative, it is contemplated that the ratio of "P" to "I" frames in each GOP can be dynamically adjusted, based on attributes of the incoming video or under user or program control. This can be effected in adjustment process 62 between GOPs, for example by master image processor 30A changing the value k of the number of frames to be encoded by slave image processor 30B. For example, fast-action video sequences may be best encoded with fewer frames per GOP, while slow moving sequences can be fully encoded with more frames per GOP. Considering that the acquired video can include both fast-action and slower sequences, dynamic adjustment of the GOP length can be a useful tool.

Further in the alternative, the GOPs processed according to this preferred embodiment of the invention may also include bidirectionally-predicted, or "B", frames (e.g., a GOP may be partitioned as {I B B P B B P B B P} or another similar arrangement).

As described above relative to the preferred embodiment of the invention, the encoding switches among the master and slave image processors 30 at the boundaries between GOPs. This is convenient because each GOP begins with an I frame, which by definition does not require information from any preceding frames. Further in the alternative, however, the switching of the encoding process among the image processors 30 could be effected on different frame boundaries than at the GOP boundary if desired, although it is contemplated that this could involve the storing of incoming frames in multiple buffers (i.e., multiple SDRAMs 36) and would thus be less efficient because of this duplication of effort.

Further in the alternative, it is contemplated that other parameters can also be dynamically adjusted. As mentioned above, the system may include more than one slave image processor 30B; for example, up to twelve image processors 30 are contemplated for the acquisition and recording of HDTV-quality video. The enabling and disabling of these multiple slave image processors 30B is contemplated to be a dynamically adjustable parameter, with the load balancing among the various image processors controlled in response to the nature of the incoming video, or under user or program control, with the control effected by master image processor 30A. It is contemplated that these and other alternative dynamic adjustments can be readily implemented by those skilled in the art having reference to this specification.

This invention is believed to provide many important advantages in video encoding and acquisition systems. A primary advantage is the ability of a system to acquire and encode high resolution video without loss of frame rate and without skipping frames. For example, it is contemplated that a two-processor system can be constructed, using currently available processing technology, that is capable of encoding XGA resolution digital video at 30 frames per second. The system according to this invention is also scalable, so that currently available devices can be combined in order to encode digital video at extremely high resolutions (e.g., on the order of HDTV resolution) without loss of frames and without reducing the frame rate. Accordingly, video acquisition performance is believed to be greatly improved by this invention.

In addition, this invention provides such a system in which the synchronization and communication overhead required to manage the multiple image processors is extremely low. Considering that various communications technologies may be used to effect synchronization and control, such technologies including conventional USB or IEEE 1394 buses, and also interrupt handshaking for high priority, low latency, control the overhead requirements of systems according to this invention are believed to be extremely low, and are not believed to significantly impact the performance of the video encoding.

In addition, it is also contemplated that the various image processors involved in the system according to this invention may be homogeneous relative to one another, in other words implemented by way of identical devices. This approach keeps software development costs low, as each of the image processors can use identical capture and encoding software routines. Alternatively, the slave image processors may be implemented by way of different devices from that of the master image processor, to achieve reduced chip and system cost, if desired.

It is contemplated that these and other alternative implementations of this invention will be apparent to, and can be readily implemented by, those skilled in the art having reference to this specification.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A digital video acquisition system, comprising:
   an imager for generating a sequence of digital video frame data;
   a master image processor, having an input coupled to receive the digital video frame data from the imager, for encoding the digital video frame data into a compressed format;
   a master memory, coupled to the master image processor, for storing encoded digital video data; and
   a first slave image processor, having an input coupled to receive the digital video frame data from the imager, having a control input for receiving control signals from the master image processor, the first slave image processor for encoding the digital video frame data into a compressed format when enabled by the master image processor;
   wherein the master image processor controls the first slave image processor so that the master image processor encodes digital video frame data corresponding to a first group of pictures, and so that the first slave image processor encodes digital video frame data corresponding to a second group of pictures contiguous in the sequence with, and later in time in the sequence than, the first group of pictures;

wherein the master image processor completes encoding the digital video frame data corresponding to the first group of pictures while the first slave image processor is encoding the digital video frame data corresponding to the second group of pictures;

and wherein the master image processor stores, in the master memory, digital video frame data encoded by the master image processor, and digital video frame data encoded by the first slave image processor.

2. The system of claim 1, further comprising:

an audio codec, for generating a sequence of digital audio data corresponding to the sequence of digital video data, the audio codec having an output coupled to the master image processor.

3. The system of claim 2, wherein the master image processor is also for storing digital audio data in the master memory in association with the encoded digital video data.

4. The system of claim 1, further comprising:

a first slave memory, coupled to the first slave image processor, for storing digital video data encoded by the first slave image processor.

5. A digital video acquisition system, comprising:

an imager for generating a sequence of digital video frame data;

a master image processor, having an input coupled to receive the digital video frame data from the imager, for encoding the digital video frame data into a compressed format;

a master memory, coupled to the master image processor, for storing encoded digital video data;

a first slave image processor, having an input coupled to receive the digital video frame data from the imager, having a control input for receiving control signals from the master image processor, the first slave image processor for encoding the digital video frame data into a compressed format when enabled by the master image processor;

a first slave memory, coupled to the first slave image processor, for storing digital video data encoded by the first slave image processor; and a bus connected to the master image processor and the first slave image processor;

wherein the first slave image processor is also for transferring encoded digital video data to the master image processor over the bus;

and wherein the master image processor is also for storing encoded digital video data received from the first slave image processor over the bus in the master memory.

6. The system of claim 1, wherein the master memory comprises:

random access memory.

7. The system of claim 6, wherein the master memory further comprises:

a memory card.

8. The system of claim 1, further comprising:

a display, coupled to the master image processor, for displaying video image data from the master image processor.

9. The system of claim 1, further comprising:

a second slave image processor, having an input coupled to receive the digital video frame data from the imager, having a control input for receiving control signals from the master image processor, the second slave image processor for encoding the digital video frame data into a compressed format when enabled by the master image processor.

10. A method of encoding digital video image data, comprising the steps of:

receiving a sequence of digital video image data;

encoding a first group of frames of the sequence with a master image processor;

encoding a second group of frames of the sequence that are later in time in the sequence than the first group of frames, with a slave image processor, the encoding of the second group of frames in the sequence beginning during the step of encoding the first group of frames with the master image processor; and storing the first group of frames, encoded by the master image processor, and the second group of frames, encoded by the slave image processor, in a memory.

11. The method of claim 2, further comprising:

encoding a third group of frames with the master image processor during the step of encoding the second group of frames.

12. The method of claim 2, further comprising:

after the step of encoding the second group of frames, communicating the encoded second group of frames to the master image processor;

wherein the storing step is performed by the master image processor.

13. The method of claim 10, further comprising:

selecting the number of frames in each group of frames.

14. The method of claim 13, further comprising:

after the encoding of one of the plurality of groups of frames, changing the number of frames each group of frames.

15. A method of encoding digital video image data, comprising the steps of:

booting a master image processor from a boot memory;

during the booting step, maintaining a slave image processor in a reset state;

then booting the slave image processor from the boot memory;

after the step of booting the master image processor, receiving a sequence of digital video image data;

encoding a first group of frames of the sequence with the master image processor;

encoding a second group of frames of the sequence with the slave image processor during the step of encoding the first group of frames with the master image processor; and storing the encoded first and second group of frames in a memory.

16. The method of claim 10, further comprising:

during the encoding steps, displaying video images corresponding to the received sequence of digital video image data.

17. A method of encoding digital video image data, comprising the steps of:

receiving a sequence of digital video image data, the sequence comprising a first group of frames followed by a second group of frames;

encoding the first group of frames of the sequence with a master image processor;

during the receiving of the first group of frames, issuing a control signal from the master image processor to a slave image processor, the control signal indicating that the slave image processor is to begin encoding a selected number of frames corresponding to the second group of frames;

encoding the second group of frames with the slave image processor during the step of encoding the first group of frames with the master image processor; and storing the encoded first and second group of frames in a memory.

18. The method of claim 17, further comprising:

responsive to the control signal, issuing an acknowledge from the slave image processor to the master image processor.

19. The method of claim 18, further comprising:

setting an encode counter in the slave image processor with the selected number of frames; and responsive to the acknowledge, setting a do-not-encode counter in the master image processor with the selected number of frames.

\* \* \* \* \*

UNITED STATES PATENT AND TRADEMARK OFFICE
CERTIFICATE OF CORRECTION

PATENT NO. : 7,593,580 B2  Page 1 of 1
APPLICATION NO. : 10/890509
DATED : September 22, 2009
INVENTOR(S) : Domke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1359 days.

Signed and Sealed this

Twenty-first Day of September, 2010

David J. Kappos
*Director of the United States Patent and Trademark Office*